June 13, 1950 L. HEIDMANN 2,511,259

EQUIPMENT FOR STARTING ELECTRIC MOTORS

Filed July 21, 1947 2 Sheets-Sheet 1

Inventor
L. Heidmann
By
C. F. Wenderoth
Attorney

June 13, 1950 L. HEIDMANN 2,511,259

EQUIPMENT FOR STARTING ELECTRIC MOTORS

Filed July 21, 1947 2 Sheets-Sheet 2

Coupling contactors

| Positions | C1 | C2 | C3 | C4 | C5 | C6 | C7 | C8 | C9 | C10 | C11 | C12 | C13 | C14 | C15 | C16 | C17 | C18 | C19 | C20 | C21 |
|---|---|---|---|---|---|---|---|---|---|---|---|---|---|---|---|---|---|---|---|---|---|
| 1st. prepar | o | o | o | o | | | | | | | | o | o | o | | | | | | o | |
| 2nd prepar | o | o | o | o | | | | | | | | o | o | o | o | | | | | | |
| Series | o | o | o | o | | | | | | | | o | o | o | o | | | | | o | o |
| Ser-par | o | o | o | | | o | o | o | o | | | o | o | o | o | | | | | | o |
| Parallel | o | | | o | | | | o | o | o | o | | | | | o | o | o | o | | o |

INVENTOR

L. Heidmann

BY Wenderoth, Lind & Ponack

ATTORNEYS

Patented June 13, 1950

2,511,259

UNITED STATES PATENT OFFICE 2,511,259

EQUIPMENT FOR STARTING ELECTRIC MOTORS

Leon Heidmann, Jeumont, France, assignor to Societe Anonyme dite: Forges et Ateliers de Constructions Electriques de Jeumont, Paris, France, a corporation of France Application July 21, 1947, Serial No. 762,429
In France March 13, 1942

Section 1, Public Law 690, August 8, 1946
Patent expires March 13, 1962

3 Claims. (Cl. 318—96)

Figure 1:
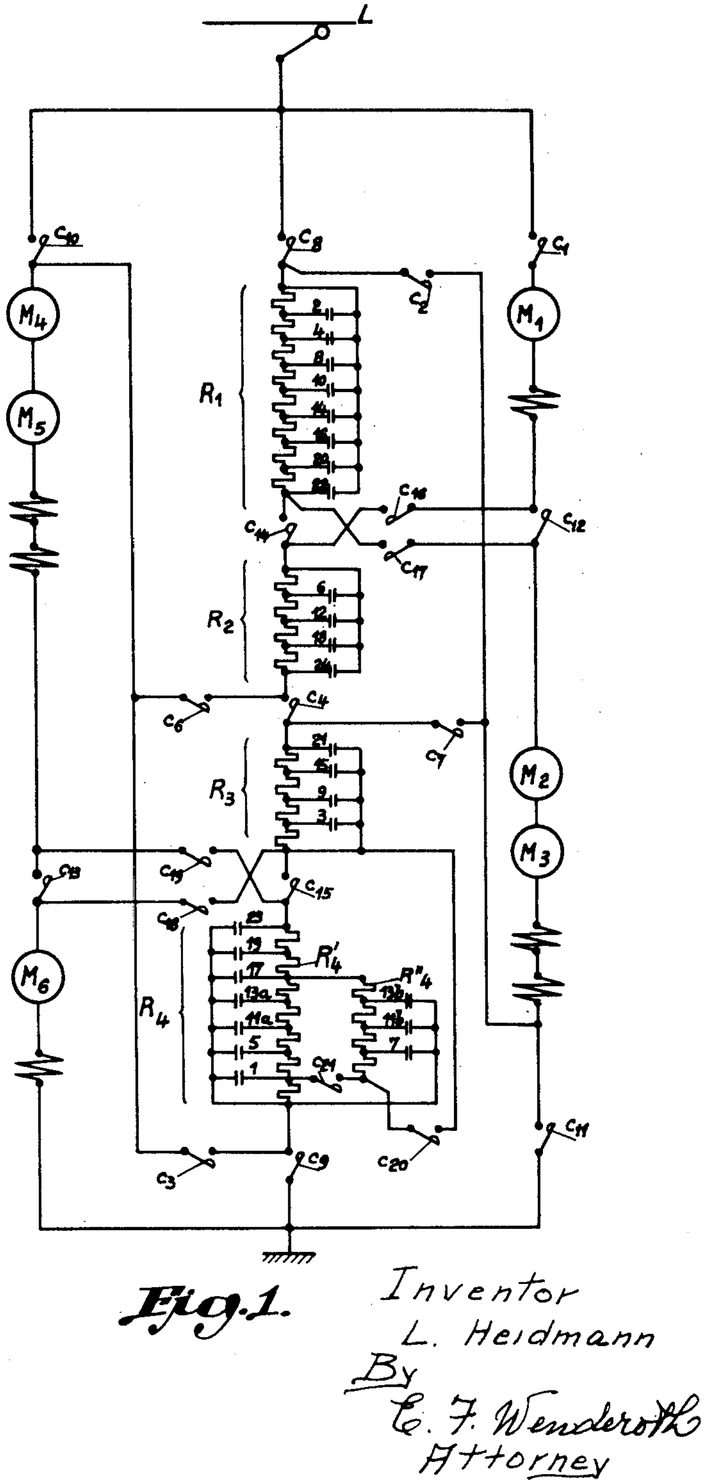

The invention relates to improvements in starting equipment effecting a progressive elimination of resistances. It refers to equipment of the type comprising a plurality of motors operating under a constant voltage being coupled in various ways for example in series, in series-parallel, and in parallel.

In equipment of the type using the bridge method for the transition from one coupling to another, usually the starting resistance is divided into several portions that are connected, at the same time as the motors, in series or in parallel in order to obtain in each of the parallel circuits substantially equal resistances which are simultaneously eliminated in all of the circuits at the same rate.

This conventional arrangement has several disadvantages. In the case of six motors, for example, the number of notches that are obtained in series-parallel is two times smaller, and in parallel three times smaller than in series. When a very progressive starting is desired the number of notches becomes thus insufficient in series-parallel and especially so in parallel.

On the other hand, the tapping of the rheostats has to be different from each of the various motor couplings, so that it is often impossible to use the same contactors for eliminating the resistances in each of these couplings. The control apparatus, such as controllers, must consequently include for each coupling different segments and fingers, which results in a considerable increase in weight, in complexity and in price.

On the other hand it is often necessary to provide at the beginning of the starting operation one or more preparatory reduced current notches, for example for idle running or for obtaining a reduced speed. In the usual equipment it is necessary to provide for this purpose additional resistances which are only used in the series coupling and consequently increase the weight and the volume of the equipment while further complicating the controllers.

It has already been proposed to increase the number of starting notches for asynchronous polyphase motors by short-circuiting in turn the different sections of the rotor resistances connected in the various phases, in place of acting simultaneously upon all the phases. In the case of such polyphase motors the problem is simple because the various circuits to be controlled are coupled in an unchangeable way, while in the equipment to which the present invention refers the starting resistances have to be used in different couplings.

The present invention has for an object avoiding the above disadvantages by using a similar method, but by applying new means enabling the control of a plurality of circuits coupled either in series, in series-parallel, or in parallel, while effecting the starting operations with the same control apparatus, for example with the same controller always operating exactly in the same manner.

The invention consists essentially in forming the starting resistance with a plurality of unequal rheostats, each tapped or divided into sections in such a way that once the rheostats are inserted into the various parallel circuits according to the respective couplings, a progressive step by step elimination of their respective sections is effected in turn according to a cyclical order. The connections, the ohmic values and the operating sequence of said sections and of their respective contactors are such that by using always the same contactors operating in the same order (whatever may be the coupling of the motors to start) substantially the same variations of the resulting torque are obtained at all the starting notches and excessive overloads of the various circuits due to the transitional unbalance of their currents are eliminated.

The elimination of the resistances carried out alternatively or cyclically in the different circuits in accordance with the invention results in increasing the minimum value of the total effort produced by the motors during the starting as compared with that which is obtained with the conventional simultaneous elimination.

Some of the rheostats above are formed by two or more resistances which can be connected in parallel, so that in a normal starting operation their respective sections are or can be eliminated alternately, while in order to secure the preparatory reduced current notches, these resistances are connected in series. This connection in series or in parallel of the resistances forming a rheostat is effected preferably through the intermediary of coupling means such as coupling controllers provided for the various groupings of the motors.

Figures 2, 3, 4, 5:
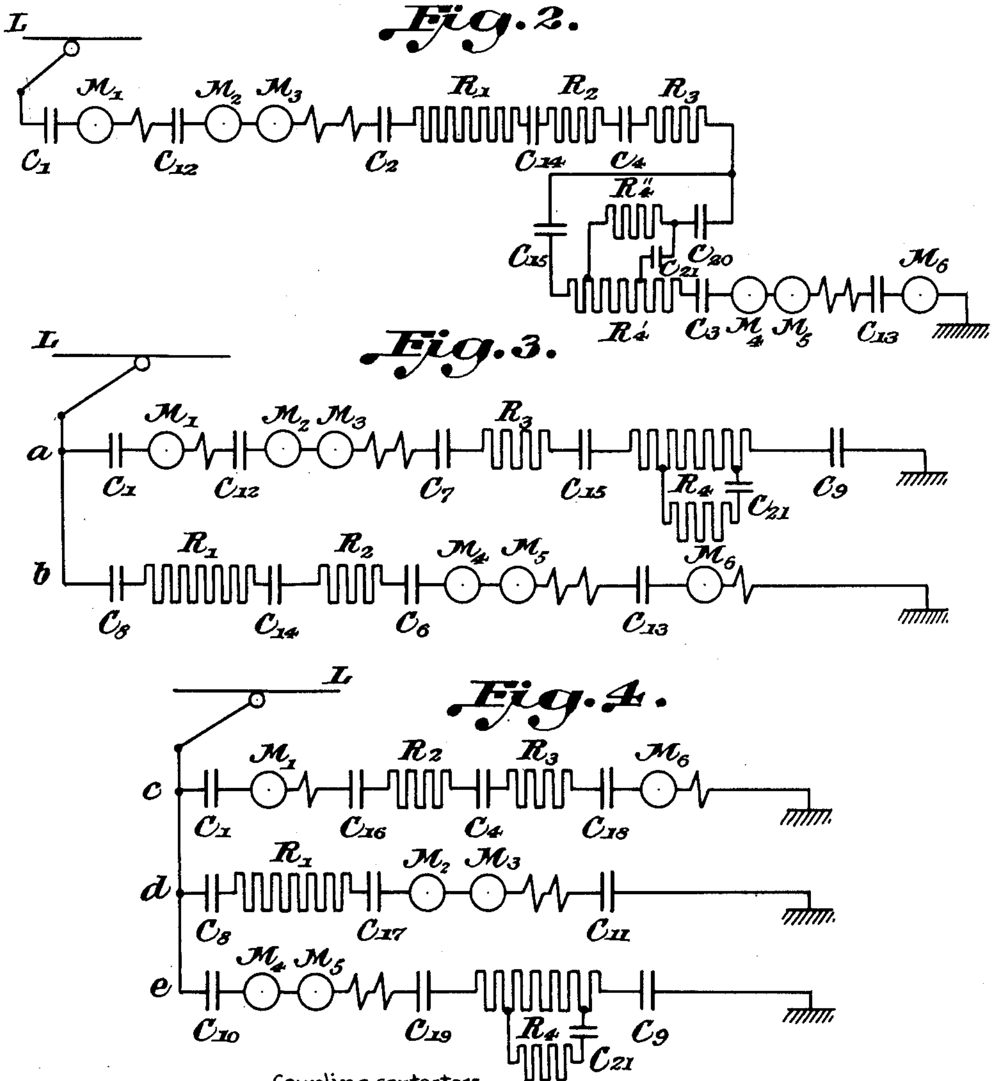

Other objects of the invention will be appreciated by reference to the description given below and to the attached drawings in which Fig. 1 is a general connection diagram of the traction circuits, Figs. 2, 3 and 4 show respectively the connections obtained in different couplings and Fig. 5 indicates the operating sequence of the coupling controllers.

The equipment as shown in Fig. 1 comprises six motors $M_1$ to $M_6$ receiving power from the line L and connected by the group of coupling contactors $C_1$ to $C_{21}$ either in series, in two series-parallel groups, or in three parallel groups. The starting resistance comprises four rheostats $R_1$ to $R_4$, $R_4$ being formed by two partial rheostats $R'_4$ and $R''_4$. The resistances are progressively eliminated by the group of rheostatic contactors 1 to 24, this operation being controlled as usual by an appropriate acceleration relay. In order that this relay may always be responsive to the total effort developed by the motors whatever may be the coupling of these motors, it is energized through a shunt the resistance of which depends upon the number of parallel circuits.

Instead of giving as usual to the rheostats $R_2$ and $R_3$ equal ohmic values which are two times smaller than that of the rheostats $R_1$ and $R_4$, their ohmic values are chosen in such a way that at the first notches of the series-parallel and parallel couplings there is a certain unbalance of currents and the successive closing of the rheostatic contactors 1 to 24 is always effected in the same order with an unbalance of the same order as that of the first notches.

For example, it will be assumed that for $R_1$ and $R_4$ the ohmic values are equal to 1, for $R_2$ the value is about 0.47 and for $R_3$ about 0.61.

With this arrangement the operation of the equipment is as follows:

*The first coupling.*—The connections of the first or series coupling are shown in Fig. 2. There are two preparatory low speed series notches and a normal series notch.

In the first preparatory series notch the coupling contactors $C_1$, $C_2$, $C_3$, $C_4$, $C_{12}$, $C_{13}$, $C_{14}$, and $C_{20}$ are closed. The circuit comprises in series the resistors $R_1$, $R_2$, $R_3$, $R_4''$, and almost the totality of $R_4'$. This is the lowest current notch.

In the second preparatory series notch the contactor $C_{20}$ is opened and $C_{15}$ is closed instead, so that $R_4''$ is eliminated and $R_4'$ is in circuit in series with $R_1$ $R_2$ $R_3$.

In the normal series notch the contactors $C_{15}$ $C_{20}$ and $C_{21}$ are closed so that $R_4''$ is in parallel with a part of $R_4'$ as can be seen in Fig. 2. The normal starting operation is then continued through the successive closure of the rheostatic contactors 1 to 24 (see Fig. 1) in the order of their numbering, thus eliminating cyclically step by step all resistances, while the coupling contactors remain in the same position as shown in Fig. 5.

*The second coupling.*—The second coupling (or series parallel) is effected, after a transition by the bridge method, in closing the coupling contactors $C_1$ $C_6$ $C_7$ $C_8$ $C_9$ $C_{12}$ $C_{13}$ $C_{14}$ $C_{15}$ and $C_{21}$. Thereby the connection diagram shown in Fig. 3 is obtained, comprising two parallel circuits *a* and *b*, each containing in the considered case three motors in series. The corresponding position of coupling contactors is shown in Fig. 5.

This position is maintained while the rheostatic contactors 1 to 24 are successively closed again in their numerical order. It is to be noted that the odd contactors 1, 3, 5 etc. eliminate the resistances in the circuit *a*, while the even contactors 2, 4, 6 etc. operate in the circuit *b*, so that the various resistances are cyclically eliminated in turn.

In the particular case which has been assumed above, the initial resistance in the circuit (*a*) is equal to $R_3+R_4=1.61$ and in the circuit (*b*) to $R_1+R_2=1.47$ so that there is a certain initial unbalance. The elimination of resistances begins in the more resistive circuit (*a*) wherein the contact 1 closes in the first place.

The respective values of the various rheostat elements which are alternatively short-circuited in both circuits are such that after the closing of the rheostatic contactor 1 there is produced a slight unbalance of the same order, but of the opposite direction and so on. As a result, the amplitude of variations of the resulting tractive effort produced by the six motors remains substantially constant and none of the motors are overloaded. Due to this arrangement of the resistances the minimum value of the resulting effort variations is increased with respect to the corresponding value which would be obtained by the conventional simultaneous elimination of the resistances, and the number of starting notches is increased.

*The third coupling.*—The third coupling (parallel) is obtained, after a second bridge transition, by the closure of coupling contactors $C_1$ $C_4$ $C_8$ $C_9$ $C_{10}$ $C_{11}$ $C_{16}$ $C_{17}$ $C_{18}$ $C_{19}$ and $C_{21}$ as shown in Fig. 5. The resulting coupling, shown in Fig. 4, comprises three parallel circuits *c*, *d* and *e* each containing two motors. In this position the rheostatic contactors 1 to 24 are closed again step by step, still operating as above in their numerical order.

It is seen that first the contactor 1 eliminates a resistance in the circuit *e*, then the contactor 2 operates in the circuit *d*, the contactor 3 in the circuit *c*, the contactor 4 again in the circuit *d*, the contactor 5 again in the circuit *e* and so on, so that all parallel circuits are cyclically controlled in turn.

The ohmic values of the various rheostat sections are such that the amplitude of the resulting tractive effort variations is again substantially constant. There is obtained for each of the couplings the same number of starting notches and the minimum value of the tractive effort approaches its maximum value.

As stated above, the resistance $R_4$ comprises two separate partial rheostats $R'_4$ and $R''_4$. The starting operation of those rheostats can be effected in different ways. It will be assumed for instance that the rheostatic contactors 11*a* and 11*b* are closed at the same time, as well as the contactors 13*a* and 13*b*, while the contactors 6 and 7 close separately producing separate notches. In this case the rheostat $R'_4$ has less notches than $R''_4$.

It is obvious however that all contactors of $R'_4$ and $R''_4$ can be operated in turn, that other resistances, such as $R_1$ can be formed by two partial rheostats and that various other arrangements can be used.

It is seen that by the disclosed distribution and appropriate cyclical operating sequence of the rheostatic contactors, in connection with the appropriate subdivision of the resistance sections of the various circuits, very important advantages may be obtained, and more particularly the following:

In all the motor couplings, effected for instance by a coupling controller the same starting apparatus may be used, for example, the same rheostatic controller effecting one turn per coupling. As a result, the equipment is substantially simplified and in each coupling the same number of notches is obtained with a very progressive starting in the high speed couplings.

Without adding special resistances which are disadvantageous, preliminary starting notches may be obtained for producing a very small motor torque or speed, by subdividing suitably one or several rheostats into partial rheostats which are connected in series and in parallel. These connections are preferably carried out by coupling contactors forming a coupling controller, so that the normal rheostatic controller is not complicated.

The amplitude of variations of the resulting tractive effort during the starting operation is substantially reduced, the minimum effort being increased with relation to that which would be obtained with the conventional non-alternative elimination of the resistances.

It is obvious that the operation described can be modified in various ways without departing from the spirit of the present invention. Particularly the invention can be used with any number of motors, with shunting or electrical braking means, the number of notches can be modified, other resistances can be divided in two or otherwise, other circuit control means can be used, etc.

I claim:

1. In an equipment for starting a plurality of electric motors in series coupling, a series-parallel coupling with two motor circuits and a parallel coupling with three motor circuits, the combination of, a starting resistance comprising four rheostats divided into sections, the first and the fourth of said rheostats being of equal values, the second having a value of about 47% and the third of about 67% of the first, a plurality of coupling contactors connected and adapted to form the said motor circuits, the series motor circuit including all said rheostats, one of the said series-parallel motor circuits comprising the third rheostat connected in series with the fourth and the other comprising the first rheostat connected in series with the second, while in the said parallel coupling the corresponding motor circuits comprise respectively: first, the second rheostat connected in series with the third, second, the first rheostat and, third the fourth rheostat, whereby the resistances of said motor circuits are unequal and a definite unbalance of currents in the said motor circuits is obtained, a plurality of starting contactors adapted to close in a constant cyclical sequence and interconnected with said rheostat sections in such an order that at each series-parallel and parallel starting step a rheostat section in a single motor circuit is short-circuited cyclically, whereby the same number of starting steps in all couplings is obtained, and such a distribution of said rheostat sections that before each starting step the short-circuited section is always located in the most resistant motor circuit, while after this starting step the same motor circuit presents the lowest resistance, which results in a new and similar unbalance of currents.

2. In an equipment for starting a plurality of electric motors in series coupling, a series-parallel coupling with two motor circuits and a parallel coupling with three motor circuits, the combination of, a starting resistance comprising four rheostats divided into sections, the first and the fourth of said rheostats being of equal values, the second having a value of about 47% and the third of about 67% of the first, a plurality of coupling contactors connected and adapted to form the said motor circuits, the series motor circuit including all said rheostats, one of the said series-parallel motor circuits comprising the third rheostat connected in series with the fourth and the other comprising the first rheostat connected in series with the second, while in the said parallel coupling the corresponding motor circuits comprise respectively: first, the second rheostat connected in series with the third, second, the first rheostat and, third the fourth rheostat, whereby the resistances of said motor circuits are unequal and a definite unbalance of currents in the said motor circuits is obtained, a plurality of starting contactors adapted to close in a constant cyclical sequence and interconnected with said rheostat sections in such an order that at each series-parallel and parallel starting step a rheostat section in a single motor circuit is short-circuited cylically, whereby the same number of starting steps in all couplings is obtained, and such a distribution of said rheostat sections that before each starting step the short-circuited section is always located in the most resistant motor circuit, while after this starting step the same motor circuit presents the lowest resistance, which results in a new and similar unbalance of currents, the said starting contactors being grouped to form a controller adapted to effect one turn per coupling.

3. In an equipment for starting a plurality of electric motors in series coupling, a series-parallel coupling with two motor circuits and a parallel coupling with three motor circuits, the combination of, a starting resistance comprising four rheostats divided into sections, the first and the fourth of said rheostats being of equal values, the second having a value of about 47% and the third of about 67% of the first, a plurality of coupling contactors connected and adapted to form the said motor circuits, the series motor circuit including all said rheostats, one of the said series-parallel motor circuits comprising the third rheostat connected in series with the fourth and the other comprising the first rheostat connected in series with the second, while in the said parallel coupling the corresponding motor circuits comprise respectively: first, the second rheostat connected in series with the third, second, the first rheostat and, third the fourth rheostat, whereby the resistances of said motor circuits are unequal and a definite unbalance of currents in the said motor circuits is obtained, a plurality of starting contactors adapted to close in a constant cyclical sequence and interconnected with said rheostat sections in such an order that at each series-parallel and parallel starting step a rheostat section in a single motor circuit is short-circuited, cyclically, whereby the same number of starting steps in all couplings is obtained, and such a distribution of said rheostat sections that before each starting step the short-circuited section is always located in the most resistant motor circuit, while after this starting step the same motor circuit presents the lowest resistance, which results in a new and similar unbalance of currents, the said starting contactors being grouped to form a controller adapted to effect one turn per coupling, one of the said rheostats comprising two separate tapped rheostatic elements controlled by said coupling contactors and adapted to be connected, at least partially, in series for producing preliminary starting notches, and in parallel for producing normal starting notches.

LEON HEIDMANN.

REFERENCES CITED

The following references are of record in the file of this patent:

UNITED STATES PATENTS

| Number | Name | Date |
|---|---|---|
| 1,061,299 | Jones | May 13, 1913 |
| 1,189,292 | Riley | July 4, 1916 |
| 1,264,941 | Jones et al. | May 7, 1918 |
| 1,267,817 | Stearns et al. | May 28, 1918 |